(12) United States Patent
Chiu et al.

(10) Patent No.: US 8,000,833 B2
(45) Date of Patent: Aug. 16, 2011

(54) SYSTEM AND METHOD FOR CUTTING SURFACE OF CORE INSERT

(75) Inventors: Wen-Ssu Chiu, Taipei Hsien (TW);
Kun-Jung Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 356 days.

(21) Appl. No.: 12/342,214

(22) Filed: Dec. 23, 2008

(65) Prior Publication Data

US 2009/0326705 A1 Dec. 31, 2009

(30) Foreign Application Priority Data

Jun. 30, 2008 (CN) .......................... 2008 1 0302449

(51) Int. Cl.
G06F 19/00 (2006.01)
B26D 5/20 (2006.01)
B27B 19/10 (2006.01)
B23B 39/04 (2006.01)
B23G 1/00 (2006.01)

(52) U.S. Cl. ........ 700/186; 700/159; 700/160; 700/187; 83/215; 83/284; 83/747; 408/8; 408/10; 408/13

(58) Field of Classification Search .......... 700/159–160, 700/186–187; 83/215, 284, 747; 407/27, 407/30; 408/8–13

See application file for complete search history.

(56) References Cited

U.S. PATENT DOCUMENTS

| | | | | |
|---|---|---|---|---|
| 4,579,487 A * | 4/1986 | Lehmkuhl | ...................... | 409/134 |
| 5,315,523 A * | 5/1994 | Fujita et al. | .................... | 700/180 |
| 5,885,199 A * | 3/1999 | Shao | ............................... | 483/19 |
| 5,888,037 A * | 3/1999 | Fujimoto et al. | ................ | 409/79 |
| 6,155,148 A * | 12/2000 | Shinozaki et al. | ............. | 82/1.11 |
| 7,203,569 B2 * | 4/2007 | Liang et al. | .................... | 700/186 |
| 2006/0047358 A1 * | 3/2006 | Liang et al. | .................... | 700/186 |
| 2007/0276534 A1 * | 11/2007 | Takahashi et al. | ............ | 700/193 |

OTHER PUBLICATIONS

Shoji Kawamura, capturing images with digital still cameras, Micro, IEEE, Nov.-Dec. 1998, vol. 18, issue: 6, pp. 14-19.

* cited by examiner

Primary Examiner — Ramesh Patel
(74) Attorney, Agent, or Firm — Clifford O. Chi

(57) ABSTRACT

A system for cutting a given portion of a surface of a core insert includes a piezoelectric actuator, a turning tool, a rotating member, a driving unit and a numerically-controlled unit. The controlling unit stores coordinates of the storing coordinates of each point on the given portion of the surface in a predetermined coordinate system, and compares the instant coordinates of the cutting portion of the turning tool with the stored coordinates of the given portion, thus controlling the piezoelectric actuator to drive the turning tool to cut the given portion of the surface if the coordinates of the cutting portion of the turning tool match with the stored coordinates of any point on the given portion of the surface.

2 Claims, 5 Drawing Sheets

SYSTEM AND METHOD FOR CUTTING SURFACE OF CORE INSERT

BACKGROUND

1. Technical Field

The present disclosure relates to core inserts, and particularly to a system and a method for cutting the surface of a core insert.

2. Description of Related Art

Optical lenses are critical components in optical systems. They are used in many fields, such as digital cameras, optical system, and many others. (see "capturing images with digital still cameras", Micro, IEEE Volume: 18, issue: 6, November-December 1998 Page(s): 14-19).

Most optical lenses are manufactured by molding. A molding device usually includes a male mold, a female mold, and two core inserts respectively mounted therein. The core inserts each have a molding surface for forming the optical lens.

Some systems utilize a lathe to cut the molding surface of the core insert. However, the lathe can only cut one axis-asymmetric surface at a time, presenting low efficiency and limited applicability.

What is needed, therefore, is a system and a method for cutting a surface of a core insert addressing the described limitations.

BRIEF DESCRIPTION OF THE DRAWINGS

Many aspects of the disclosure can be better understood with reference to the following drawings. The components in the drawing are not necessarily drawn to scale, the emphasis instead being placed upon clearly illustrating the principles of the present method. Moreover, in the drawings, like reference numerals designate corresponding parts throughout the several views.

DETAILED DESCRIPTION

Figure 1:
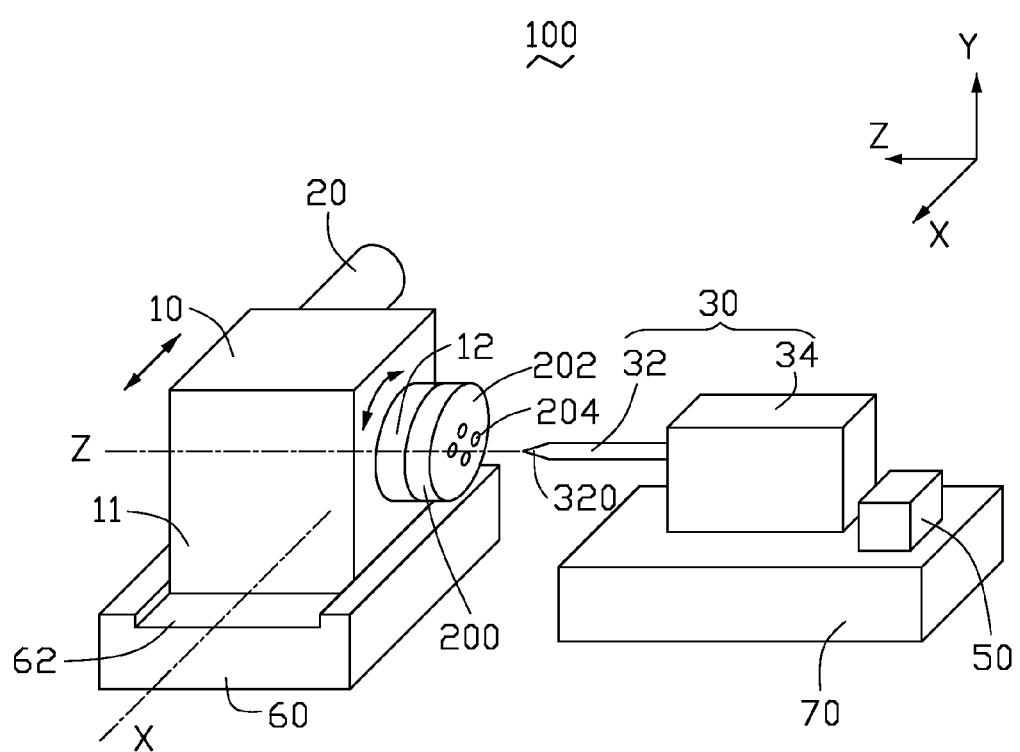
FIG. 1 is a schematic, isometric view of a cutting system in accordance with the disclosure.

Referring to FIG. 1, a cutting system 100 according to an exemplary embodiment is shown. The cutting system 100 is configured for cutting a surface 202 of a core insert 200, and includes a rotating member 10, a driving unit 20, a turning unit 30 and a numerically-controlled unit 50.

The rotating member 10 is arranged on an X-axis table 60. The X-axis table 60 has a first groove 62 defined therein along an X-axis. The rotating member 10 includes a bottom end 11 thereof slidably engaged in the first groove 62, and is mechanically coupled to and driven by the driving unit 20 to move in the X-axis direction. Generally, the rotating member 10 and the driving unit 20 each can be a servo motor.

The cutting system 100 further includes a clamping unit 12 clamping the core insert 200. The clamping unit 12 is firmly mechanically coupled to the rotating member 10. The rotating member 10 rotates the clamping unit 12 and the core insert 200 with the X-axis serving as a rotational axis. Generally, the clamping unit 12 can be a chuck.

The turning unit 30 includes a turning tool 32 firmly fixed to a piezoelectric actuator 34. The piezoelectric actuator 34 is arranged on a table 70. The turning tool 32 is driven by the piezoelectric actuator 34 to perform a reciprocating motion in the Z-axis direction. The turning tool 32 having a cutting portion 320 for cutting the surface 202 of the core insert 200.

The numerically-controlled unit 50 is disposed on the table 70 adjacent to the piezoelectric actuator 34, storing numerical data and generating control signals.

Figure 2:
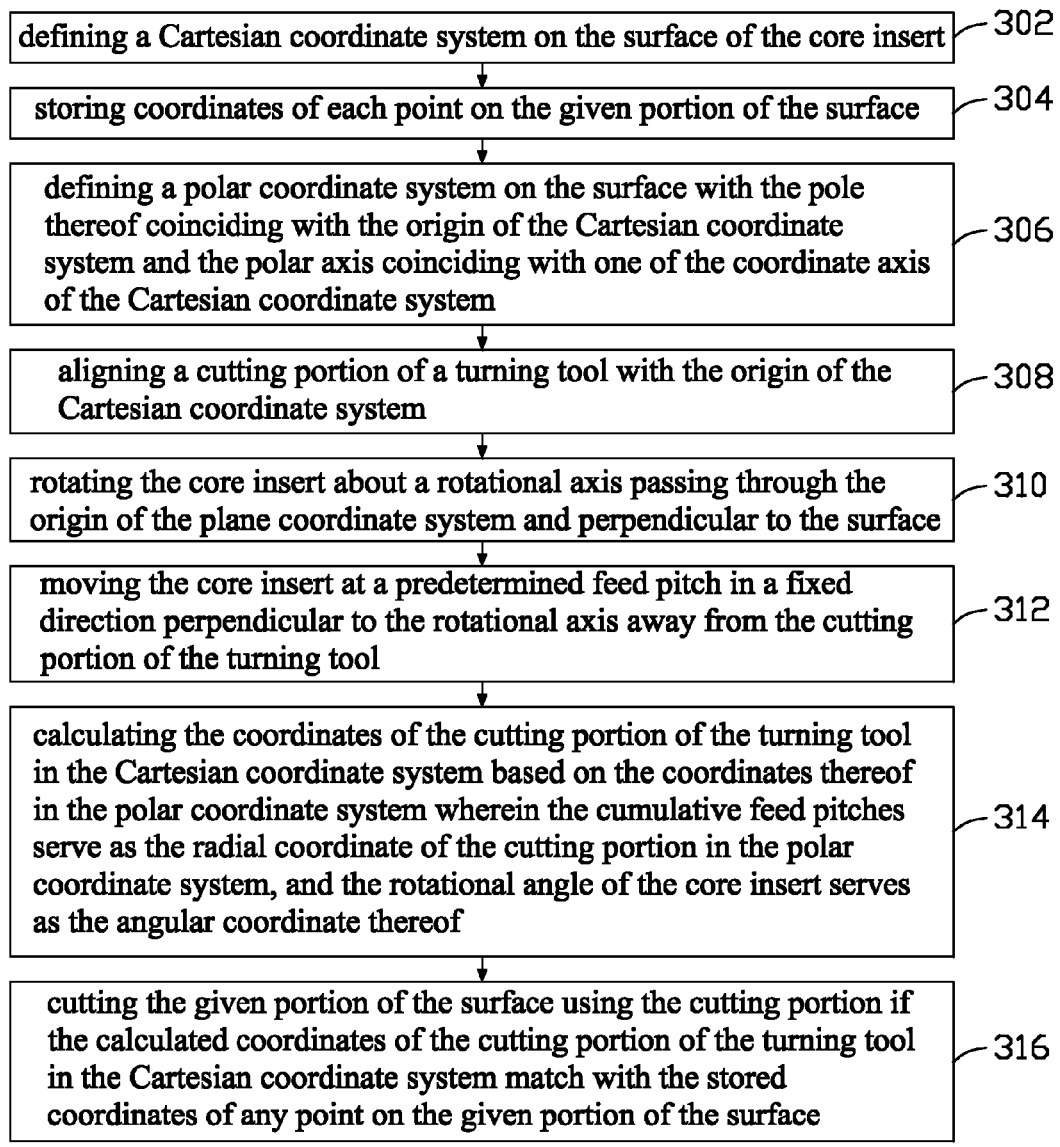
FIG. 2 is a flowchart of a method for cutting a surface of a core insert using the cutting system of FIG. 1.

Referring to FIG. 2, a method 300 for cutting the surface 202 of the core insert 200 using the cutting system 100 is shown.

The method 300 includes Step 302, in which a Cartesian coordinate system on the surface of the core insert is defined.

In Step 304, coordinates of each point on the given portion of the surface is stored.

In Step 306, a polar coordinate system on the surface with the pole thereof coinciding with the origin of the Cartesian coordinate system and the polar axis coinciding with one of the coordinate axis of the Cartesian coordinate system is defined.

In Step 308, a cutting portion of a turning tool is aligned with the origin of the Cartesian coordinate system.

In Step 310, the core insert is rotated about a rotational axis passing through the origin of the Cartesian coordinate system and perpendicular to the surface.

In Step 312, the core insert is moved at a predetermined feed pitch in a fixed direction perpendicular to the rotational axis away from the cutting portion of the turning tool.

In Step 314, the coordinates of the cutting portion of the turning tool in the Cartesian coordinate system based on the coordinates thereof in the polar coordinate system are calculated, wherein the cumulative feed pitches serve as the radial coordinate of the cutting portion in the polar coordinate system, and the rotational angle of the core insert serves as the angular coordinate thereof;

In Step 316, the given portion of the surface is cut using the cutting portion if the calculated coordinates of the cutting portion of the turning tool in the Cartesian coordinate system match with the stored coordinates of any point on the given portion of the surface.

Figure 3:
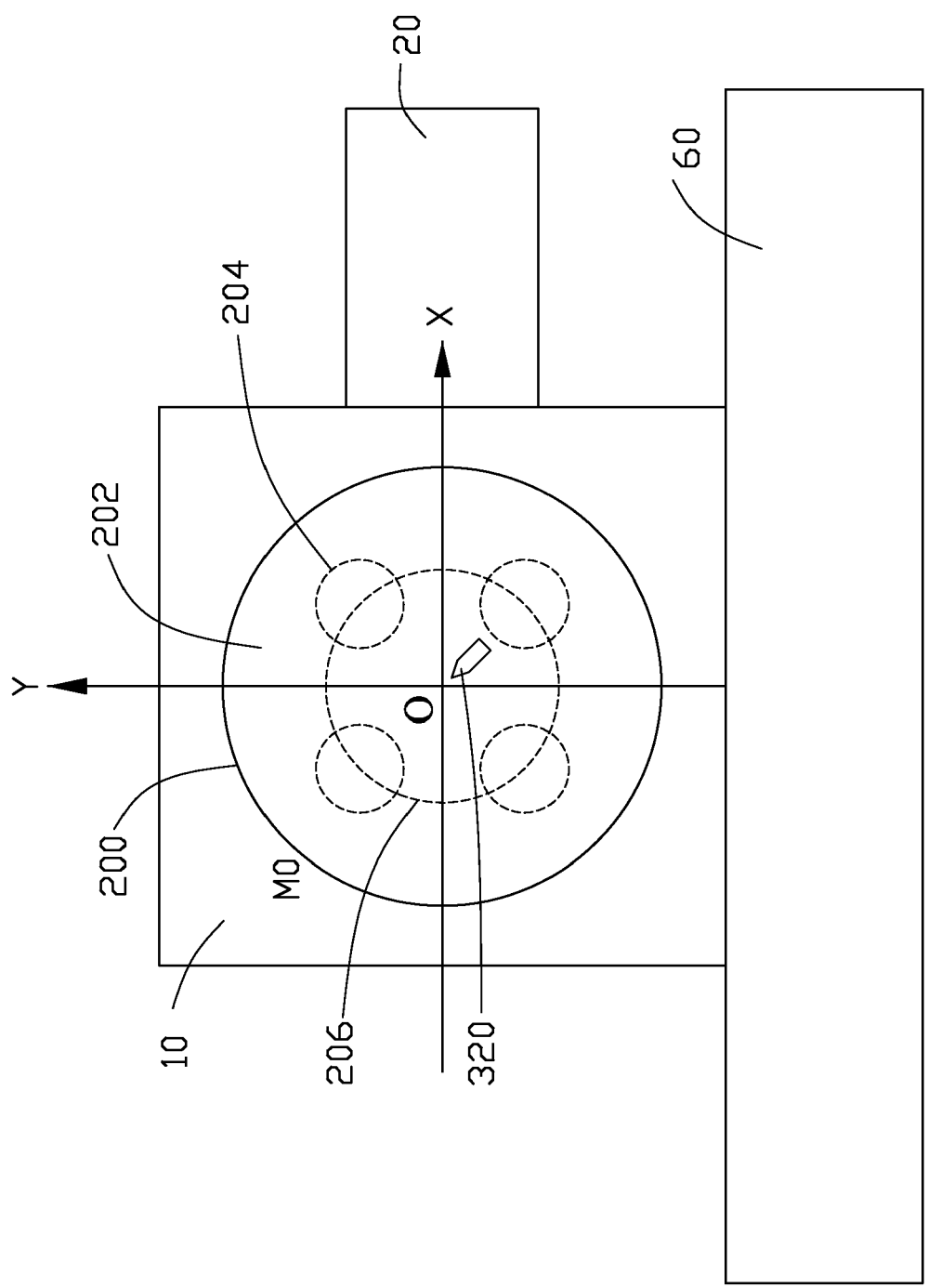
FIG. 3 is a schematic side view of the core insert with a cutting portion of the turning tool aligning with the origin of the Cartesian coordinate system using the method of FIG. 2.

Referring to FIG. 3, in Step 302, the core insert 200 is cylindrical, and the surface 202 is circular. A Cartesian coordinate system XOY having an origin O is defined on the surface 202. The origin O of the Cartesian coordinate system XOY coincides with the center O of the surface 202. The surface 202 includes four given portions 204. The four given portions 204 are arranged in an imaginary circle 206 with a center thereof coinciding with the center O of the surface 202. In the present embodiment, each given portion 204 is to be correspondingly cut to form an aspheric surface. In Step 304, coordinates of each point of the given portions 204 is stored in the numerically-controlled unit 50. In Step 306, the coordinate axis OX of the Cartesian coordinate system XOY serves as polar axis of the polar coordinate system. In Step 308, the core insert 200 is located at an original location M0 with the cutting portion 320 of the turning tool 32 aligning with the origin O of the Cartesian coordinate system XOY, as shown in FIG. 3.

Figure 4:
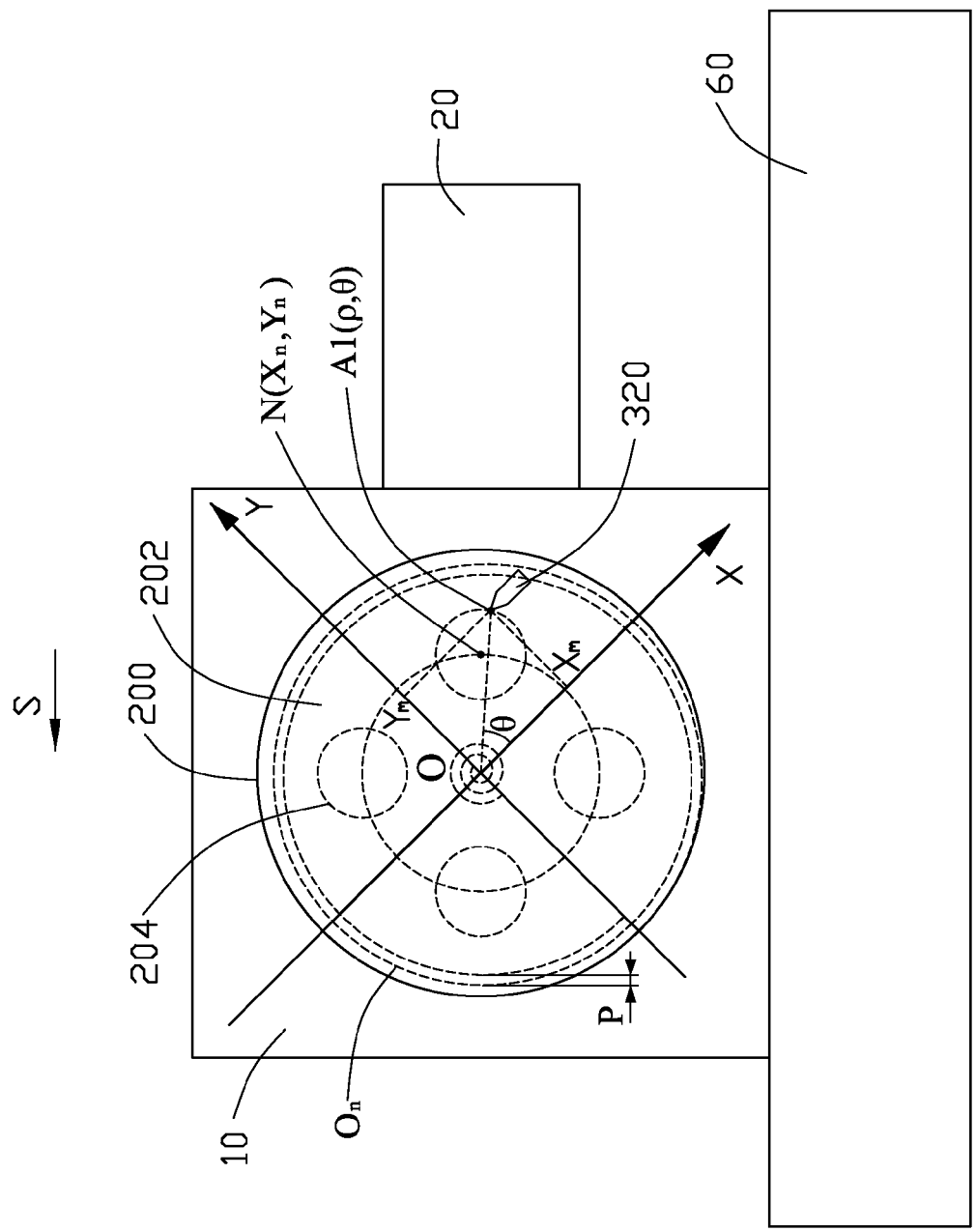
FIG. 4 is a schematic side view of the core insert with a cutting portion of the turning tool aligning with a point on the given portion of the surface using the method of FIG. 2.

Referring to FIG. 4, in step 310 and 312, the driving unit 20 moves the core insert 200 along the first groove 62 at a predetermined feed pitch P. Meanwhile, the rotating member 10 rotates the core insert 200 with a rotational angle θ. A rotational axis of the rotating member 10 passes through the center O of and is perpendicular to the surface 202. Therefore, the cutting portion 320 of the turning tool 32 accordingly moves relatively from the center O of the surface 202 to the peripheral portion of the surface 202 (shown by the arrow S in FIG. 4), and a distance ρ between the cutting portion 320 and the center O of the core insert 200 increases. When the distance ρ increases continuously at the predetermined feed pitch P, the cutting portion 320 of the turning tool 32 depicts a helical path $O_n$ in a zigzag manner. The cutting portion 320 of the turning tool 32 has a coordinate (ρ, θ) in the polar coordinate system, as shown in FIG. 4.

In step 314, the coordinates ($X_m$, $Y_m$) of the cutting portion 320 of the turning tool 32 in the Cartesian coordinate system is calculated by the numerically-controlled unit 50 from the coordinate (ρ, θ), by the formula:

$$X_m = \rho \cos\theta, Y_m = \rho \sin\theta$$

Figure 5:
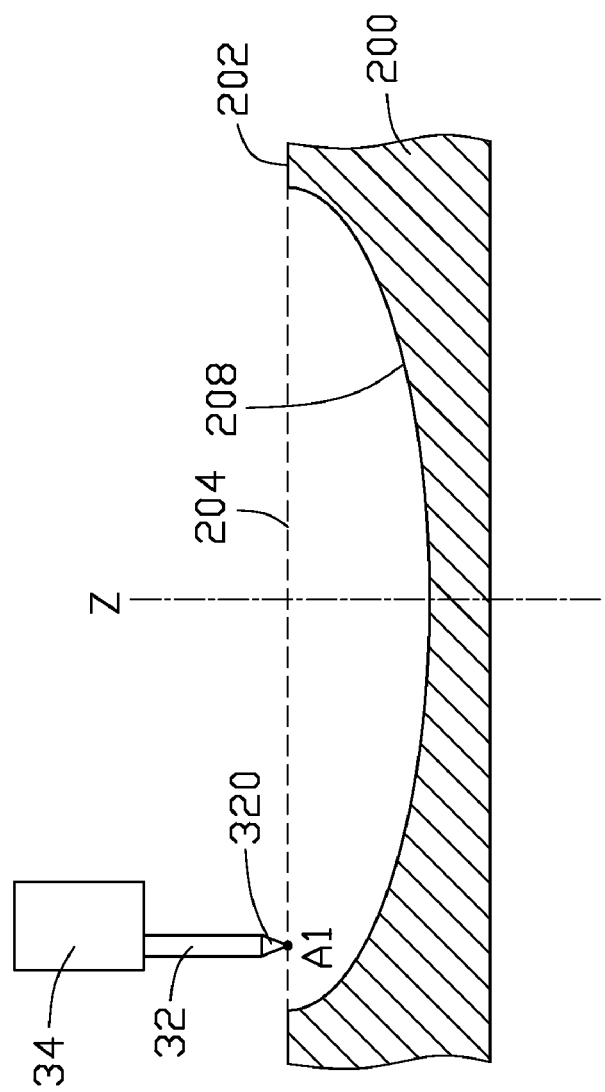
FIG. 5 is a schematic cross section of the core insert with the surface thereof cut to form an aspheric surface thereon using the method of FIG. 2.

Referring to FIGS. 4 and 5, in Step 316, the coordinates ($X_m$, $Y_m$) of the cutting portion 320 match with the stored coordinates of a point A1 on one of the given portions 204 of the surface 202. In such that, the numerically-controlled unit 50 generates a control signal. The piezoelectric actuator 34 receives the control signal and drives the tuning tool 32 to cut the point A1 on the given portion 204 to form the aspheric surface 208, as shown in FIG. 5. The profile of the aspheric surface 208 is expressed by the formula:

$$Z = \frac{CR^2}{1+\sqrt{1-(1+k)C^2R^2}} + A_4 r^4 + A_6 r^6 + A_8 r^8 + A_{10} r^{10}\ldots$$

where an optical axis Z of the aspheric surface 208 is presumed to lie along the Z-axis. The letter Z is the Z-component of the displacement of the surface from the vertex of the aspheric surface 208. The coefficients $A_i$ (i=4, 6, 8, 10 . . . ) denote i-th order aspheric coefficients. C denotes the curvature of the vertex of the aspheric surface 208. k is the conic constant. R is a distance from the optical axis Z of the aspheric surface 208, expressed by the formula:

$$R = \sqrt{(X_m - X_n)^2 + (Y_m - Y_n)^2}$$

Where the coordinates ($X_n$, $Y_n$) is the coordinates of a geometric center N of the aspheric surface 208.

The piezoelectric actuator 34 has a highest response frequency of about 400 HZ, allowing a quick response to cut the point A1 on the given portions 204 in a timely manner.

When the turning tool 32 moves from the center O to the peripheral portion of the surface 202, the four given portions 204 are cut to form four aspheric surfaces. The method 300, therefore, exhibits high efficiency in cutting of the surface 202 of the core insert 200.

The given portions 204 of the surface 202 can be cut to form other surfaces, such as spherical surface, sin wave surface etc. In addition, there can only be a given portion 204 at the center of the surface 202, thus the surface 202 of the core insert 200 can be cut to form an aspheric surface at the center thereof.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A method for cutting a given portion of a surface of a core insert, comprising:
   defining a Cartesian coordinate system on the surface of the core insert;
   storing coordinates of each point on the given portion of the surface;
   defining a polar coordinate system on the surface with the pole thereof coinciding with the origin of the Cartesian coordinate system and the polar axis coinciding with one of the coordinate axis of the Cartesian coordinate system;
   aligning a cutting portion of a turning tool with the origin of the Cartesian coordinate system;
   rotating the core insert about a rotational axis passing through the origin of the cutting portion of the turning tool;
   moving the core insert at a predetermined feed pitch in a fixed direction perpendicular to the rotational axis away from the cutting portion of the turning tool;
   calculating the coordinates of the cutting portion of the turning tool in the Cartesian coordinate system based on the coordinates thereof in the polar coordinate system wherein the cumulative feed pitches serve as the radial coordinate of the cutting portion in the polar coordinate system, and the rotational angle of the core insert serves as the angular coordinate thereof;
   cutting the given portion of the surface using the cutting portion if the calculated coordinates of the cutting portion of the turning tool in the Cartesian coordinate system match with the stored coordinates of any point on the given portion of the surface.

2. The method of claim 1, wherein the core insert is rotated during moving the core insert in the fixed direction axis away from the cutting portion of the turning tool.

* * * * *